(12) United States Patent
Jain et al.

(10) Patent No.: US 9,176,851 B2
(45) Date of Patent: Nov. 3, 2015

(54) UTILIZING INTELLIGENT AUTOMATED SCRIPTS TO TEST SOFTWARE APPLICATIONS

(75) Inventors: Maneesh Jain, Santa Clara, CA (US); Cynthia Lambinicio, Redwood City, CA (US); Raymond Pallett, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1901 days.

(21) Appl. No.: 12/027,645

(22) Filed: Feb. 7, 2008

(65) Prior Publication Data

US 2009/0204945 A1   Aug. 13, 2009

(51) Int. Cl.
*G06F 9/44* (2006.01)
*G06F 11/36* (2006.01)

(52) U.S. Cl.
CPC .......... *G06F 11/368* (2013.01); *G06F 11/3688* (2013.01)

(58) Field of Classification Search
CPC .............. G08F 11/368; G08F 11/3688; G08F 11/3684; G08F 11/3664
USPC ........................................................ 717/124
See application file for complete search history.

(56) References Cited

U.S. PATENT DOCUMENTS

| | | | |
|---|---|---|---|
| 5,754,755 A * | 5/1998 | Smith, Jr. ...................... 714/38.1 |
| 5,781,720 A * | 7/1998 | Parker et al. ............... 714/38.11 |
| 6,189,116 B1 * | 2/2001 | Mongan et al. ............ 714/38.14 |
| 6,378,088 B1 * | 4/2002 | Mongan ......................... 714/39 |
| 6,530,039 B1 * | 3/2003 | Yang .......................... 714/38.13 |
| 6,854,089 B1 * | 2/2005 | Santee et al. ................... 715/783 |
| 7,214,401 B2 * | 5/2007 | Kunst et al. .................... 426/564 |
| 7,739,680 B1 * | 6/2010 | Thakur et al. .................. 717/172 |
| 2003/0052917 A1 * | 3/2003 | Dubovsky ....................... 345/764 |
| 2003/0055836 A1 * | 3/2003 | Dubovsky ...................... 707/102 |
| 2003/0084429 A1 * | 5/2003 | Schaefer ....................... 717/125 |
| 2003/0093717 A1 * | 5/2003 | Mason ............................. 714/38 |
| 2003/0236775 A1 * | 12/2003 | Patterson ........................... 707/3 |
| 2005/0203717 A1 * | 9/2005 | Parimi ........................ 702/188 |
| 2005/0262487 A1 * | 11/2005 | Pistoia et al. ................. 717/143 |
| 2006/0156287 A1 * | 7/2006 | Vikram .......................... 717/124 |
| 2007/0022407 A1 * | 1/2007 | Givoni et al. ................. 717/124 |
| 2008/0250051 A1 * | 10/2008 | Grechanik et al. ............ 707/102 |
| 2009/0204416 A1 * | 8/2009 | King et al. ........................ 705/1 |

* cited by examiner

*Primary Examiner* — Li B Zhen
*Assistant Examiner* — Viva Miller
(74) *Attorney, Agent, or Firm* — Kilpatrick Townsend & Stockton LLP (57) ABSTRACT

Embodiments of the invention provide for utilizing an intelligent automated script to test software applications. According to one embodiment, testing a software application can comprise executing a test script for testing a plurality of versions of the software application. For example, executing the test script can comprise instantiating a first instance of the test script for testing the first version of the software application. The first version of the software application can be initiated and a temporary map of the first version of the software application can be built by the test script. The first version of the software application can be tested based on the temporary map. In some cases, a second instance of the test script can be instantiated for testing a second version of the software application. In such cases, the first and second versions of the application may be tested in parallel.

23 Claims, 8 Drawing Sheets

UTILIZING INTELLIGENT AUTOMATED SCRIPTS TO TEST SOFTWARE APPLICATIONS

BACKGROUND OF THE INVENTION

Embodiments of the present invention relate generally to methods and systems for testing software and more particularly to utilizing an intelligent automated script to test software applications.

During and following development, a software application is subjected to a variety of different tests. For example, prior to any application or version of the application being released to its users, for further development, for quality assurance testing, etc., a test should first be done to validate that no major errors are present that would prevent basic usability. That is, a test should be run to determine whether the application starts, the major functions are accessible, the user interface can be navigated, etc. Thus, for each product, a "sanity test" is normally performed. A typical sanity test includes the opening, querying, and closing of an application's pages, i.e., windows, specified in a data source.

One way to perform such a sanity test is for a tester to manually check various elements of the application. For example, a tester can manually navigate through a user interface for the application to confirm that the various elements basically function as they should such that more detailed testing can be done. However, for large applications or application suites, such testing can be very costly in terms of time and labor expenses. For example, if a tester performs a manual sanity test on an enterprise application suite, testing would require a significant amount of time. Manual testing by a multitude of manual testers would also be very expensive and still time consuming considering the dozens of pages and hundreds or thousands of objects that may be present in a product application. However, limiting sanity testing scope to reduce the time and expense needed to complete such a test could adversely affect the quality of the product. Moreover, the patching of any test environments to have an issue resolved after they have been created would require a significant amount of rework.

To reduce the time and expense of manual sanity testing, automated techniques for performing such testing have been developed. These automated techniques involve using a script, application, or suite of applications written to perform the basic procedures that the manual tester would follow. However, these scripts, applications, or suite of applications are specific to an application, suite, or version thereof that is to be tested. That is, the scripts or applications are hard-coded to function with a specific application, suite and version of that application. If a new version of the application or a different application is to be tested, the script must be modified or even completely re-written. Currently, there are no techniques using a common script that is adaptable to multiple applications and/or versions. Hence, there is a need in the art for improved methods and systems for testing software.

BRIEF SUMMARY OF THE INVENTION

Embodiments of the invention provide systems and methods for utilizing an intelligent automated script to test software applications. According to one embodiment, a method for testing a software application can comprise executing a test script for testing a plurality of versions, copies, or instances of the software application. For example, executing the test script can comprise instantiating a first instance of the test script for testing the first version of the software application. A first version of the software application can be initiated from the test script. A temporary map of the first version of the software application can be built with the test script. The first version of the software application can be tested with the test script based on the temporary map. In some cases, the method can include instantiating a second instance of the test script for testing a second version of the software application. In such cases, the first version of the application and the second version of the application may be tested in parallel. According to one embodiment, the method can be applied to multiple applications or modules within the same version of an enterprise suite release.

Building the temporary map of the first version of the software application can comprise building a map of a hierarchical structure of a user interface of the first version of the software application. In such cases, testing the first version of the software application based on the temporary map can comprise performing a sanity test on elements of the user interface. The sanity test of the user interface can comprise manipulating elements of the user interface. Error messages resulting from manipulation of the elements of the user interface can be reported.

For example, building the map of the hierarchical structure of the user interface can comprise identifying one or more objects of a first window of the user interface, identifying one or more attributes of the one or more objects of the first window, and storing an indication of the one or more objects of the first window and an indication of the one or more attributes of the one or more objects of the first window in the map. Building the map of the hierarchical structure of the user interface can further comprise identifying one or more objects of a second window of the user interface, wherein the second window comprises a child window of the first window, identifying one or more attributes of the one or more objects of the second window, and storing an indication of the one or more objects of the second window and an indication of the one or more attributes of the one or more objects of the second window in the map. Such mapping can continue with child, grandchild, and subsequent windows of the user interface.

According to another embodiment, a system can comprise a processor and a memory communicatively coupled with and readable by the processor. The memory can have stored therein a series of instructions which, when executed by the processor, cause the processor to test a software application by executing a test script for testing a plurality of versions of the software application. For example, executing the test script can comprise instantiating a first instance of the test script for testing the first version of the software application. A first version of the software application can be initiated from the test script. A temporary map of the first version of the software application can be built by the test script and the first version of the software application can be tested with the test script based on the temporary map. In some cases, a second instance of the test script can be instantiated for testing a second version of the software application. In such cases, the first version of the application and the second version of the application may be tested in parallel. Additionally, two different applications within the same application suite may be tested in parallel.

Building the temporary map of the first version of the software application can comprise building a map of a hierarchical structure of a user interface of the first version of the software application. In such cases, testing the first version of the software application based on the temporary map can comprise performing a sanity test on elements of the user interface. The sanity test of the user interface can comprise manipulating elements of the user interface. Error messages resulting from manipulation of the elements of the user interface can be reported.

For example, building the map of the hierarchical structure of the user interface can comprise identifying one or more objects of a first window of the user interface, identifying one or more attributes of the one or more objects of the first window, and storing an indication of the one or more objects of the first window and an indication of the one or more attributes of the one or more objects of the first window in the map. Building the map of the hierarchical structure of the user interface can further comprise identifying one or more objects of a second window of the user interface, wherein the second window comprises a child window of the first window, identifying one or more attributes of the one or more objects of the second window, and storing an indication of the one or more objects of the second window and an indication of the one or more attributes of the one or more objects of the second window in the map. Such mapping can continue with child, grandchild, and subsequent windows of the user interface.

According to yet another embodiment, a machine-readable medium can have stored thereon a series of instruction which, when executed by a processor, cause the processor to test a software application by executing a test script for testing a plurality of versions of the software application. For example, executing the test script can comprise instantiating a first instance of the test script for testing the first version of the software application. A first version of the software application can be initiated from the test script. A temporary map of the first version of the software application can be built by the test script and the first version of the software application can be tested with the test script based on the temporary map. In some cases, a second instance of the test script can be instantiated for testing a second version of the software application. In such cases, the first version of the application and the second version of the application may be tested in parallel. Additionally, two different applications within the same application suite may be tested in parallel.

Building the temporary map of the first version of the software application can comprise building a map of a hierarchical structure of a user interface of the first version of the software application. In such cases, testing the first version of the software application based on the temporary map can comprise performing a sanity test on elements of the user interface. The sanity test of the user interface can comprise manipulating elements of the user interface.

Building the map of the hierarchical structure of the user interface can comprise identifying one or more objects of a first window of the user interface, identifying one or more attributes of the one or more objects of the first window, and storing an indication of the one or more objects of the first window and an indication of the one or more attributes of the one or more objects of the first window in the map.

Building the map of the hierarchical structure of the user interface can further comprise identifying one or more objects of a second window of the user interface, wherein the second window comprises a child window of the first window, identifying one or more attributes of the one or more objects of the second window, and storing an indication of the one or more objects of the second window and an indication of the one or more attributes of the one or more objects of the second window in the map.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for utilizing an intelligent automated script to test software applications. Generally speaking, such a script according to embodiments of the present invention can be used with multiple applications and/or versions of an applications release to perform basic testing without modifying or re-writing the script. For example, a script according to one embodiment of the present invention can be used to perform sanity test on an application to determine whether the application's user interface is navigable, i.e., that it performs the basic functions that are expected and allows the user to navigate through the interface to access various features of the application. Such a test may be used to test a new application or version of an application, e.g., a new version adapted to or ported to a new environment etc., prior to its release for further testing, development, etc.

As will be described in detail below, testing a software application can comprise executing a test script for testing a plurality of versions of the software application. For example, executing the test script can comprise instantiating a first instance of the test script for testing the first version of the software application. A first version of the software application can be initiated from the test script. A temporary map of the first version of the software application can be built with the test script. The first version of the software application can be tested with the test script based on the temporary map. In some cases, the method can include instantiating a second instance of the test script for testing a second version of the software application. In such cases, the first version of the application and the second version of the application may be tested in parallel.

Building the temporary map of the first version of the software application can comprise building a map of a hierarchical structure of a user interface of the first version of the software application. In such cases, testing the first version of the software application based on the temporary map can comprise performing a sanity test on elements of the user interface. The sanity test of the user interface can comprise manipulating elements of the user interface. Error messages resulting from manipulation of the elements of the user interface can be reported.

For example, building the map of the hierarchical structure of the user interface can comprise identifying one or more objects of a first window of the user interface, identifying one or more attributes of the one or more objects of the first window, and storing an indication of the one or more objects of the first window and an indication of the one or more attributes of the one or more objects of the first window in the map. Building the map of the hierarchical structure of the user interface can further comprise identifying one or more objects of a second window of the user interface, wherein the second window comprises a child window of the first window, identifying one or more attributes of the one or more objects of the second window, and storing an indication of the one or more objects of the second window and an indication of the one or more attributes of the one or more objects of the second window in the map. Such mapping can continue with child and grandchild windows of the user interface.

Figure 1:
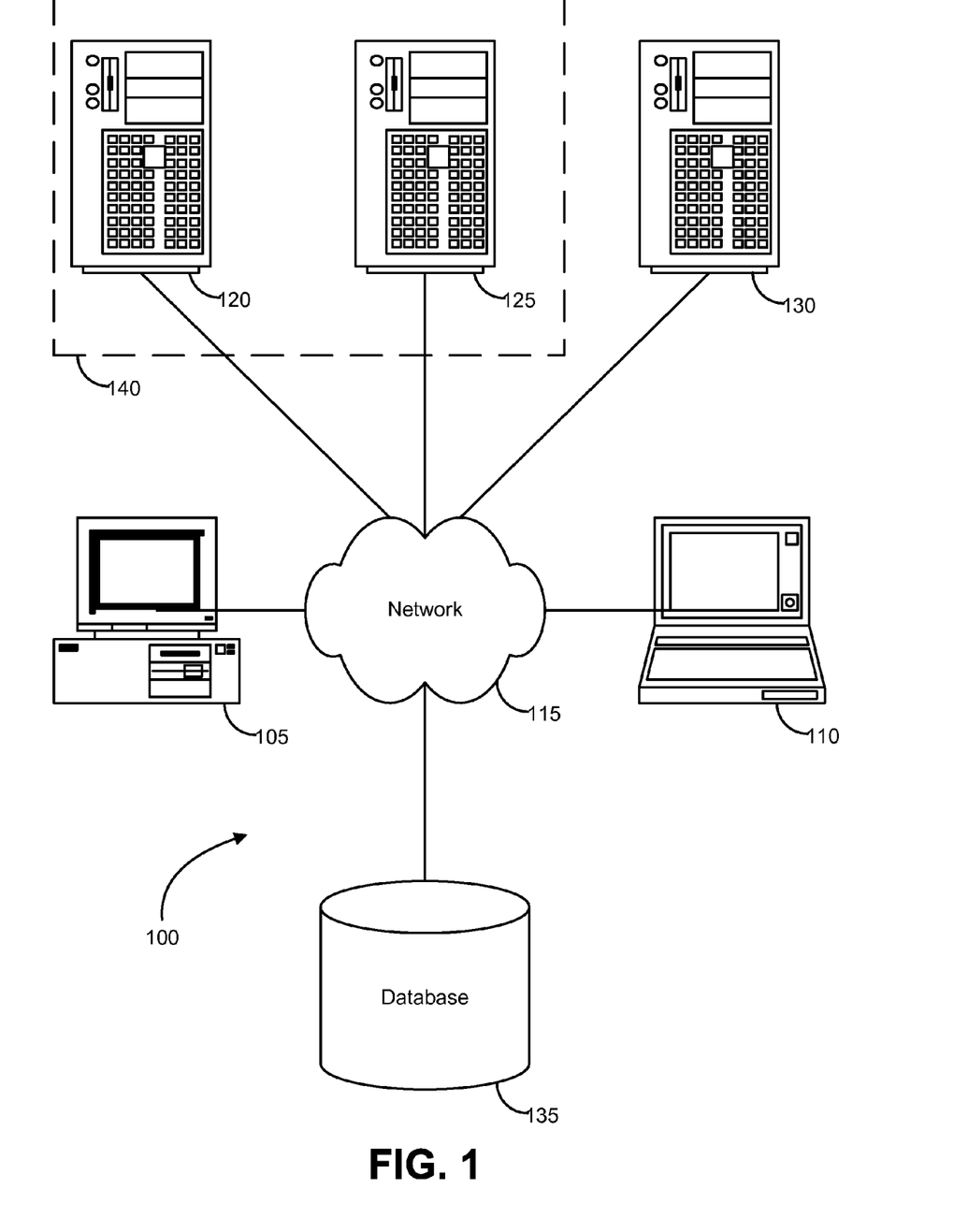
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java™ servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
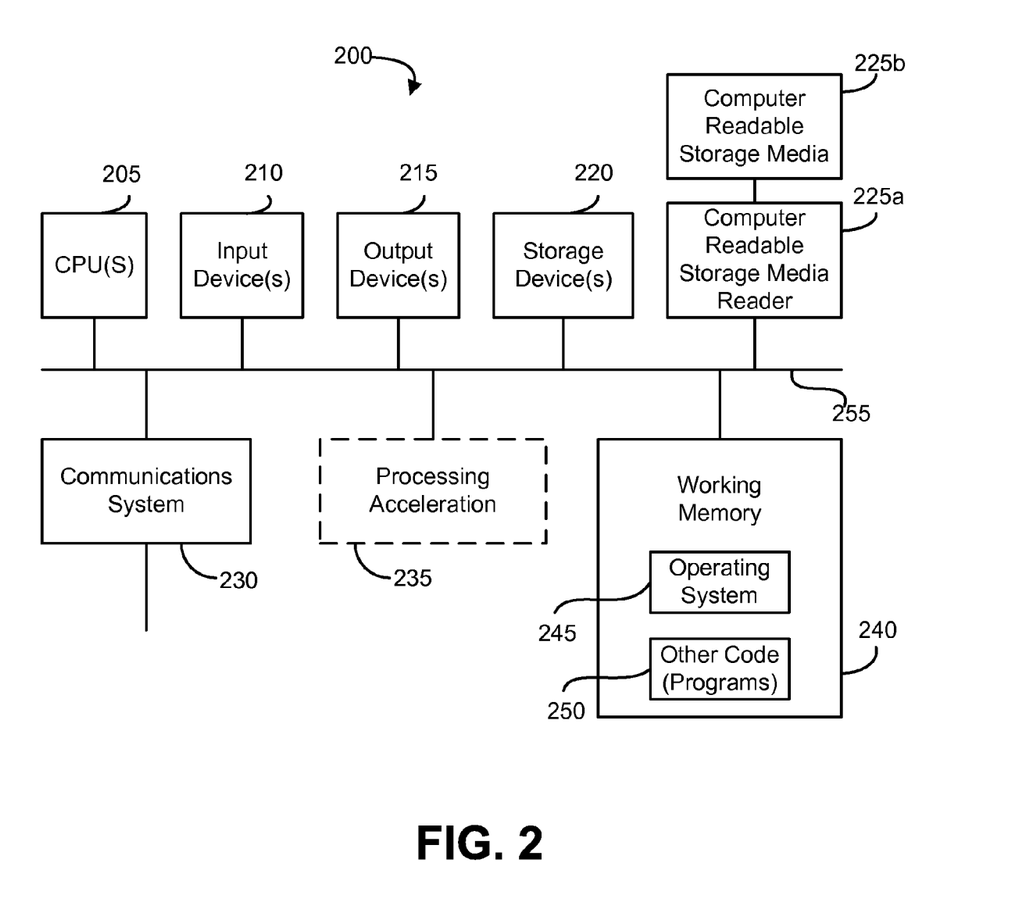
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein. For example, software of computer system 200 can include code for implementing a test script as described herein for testing an application on the same or another system.

Figure 3:
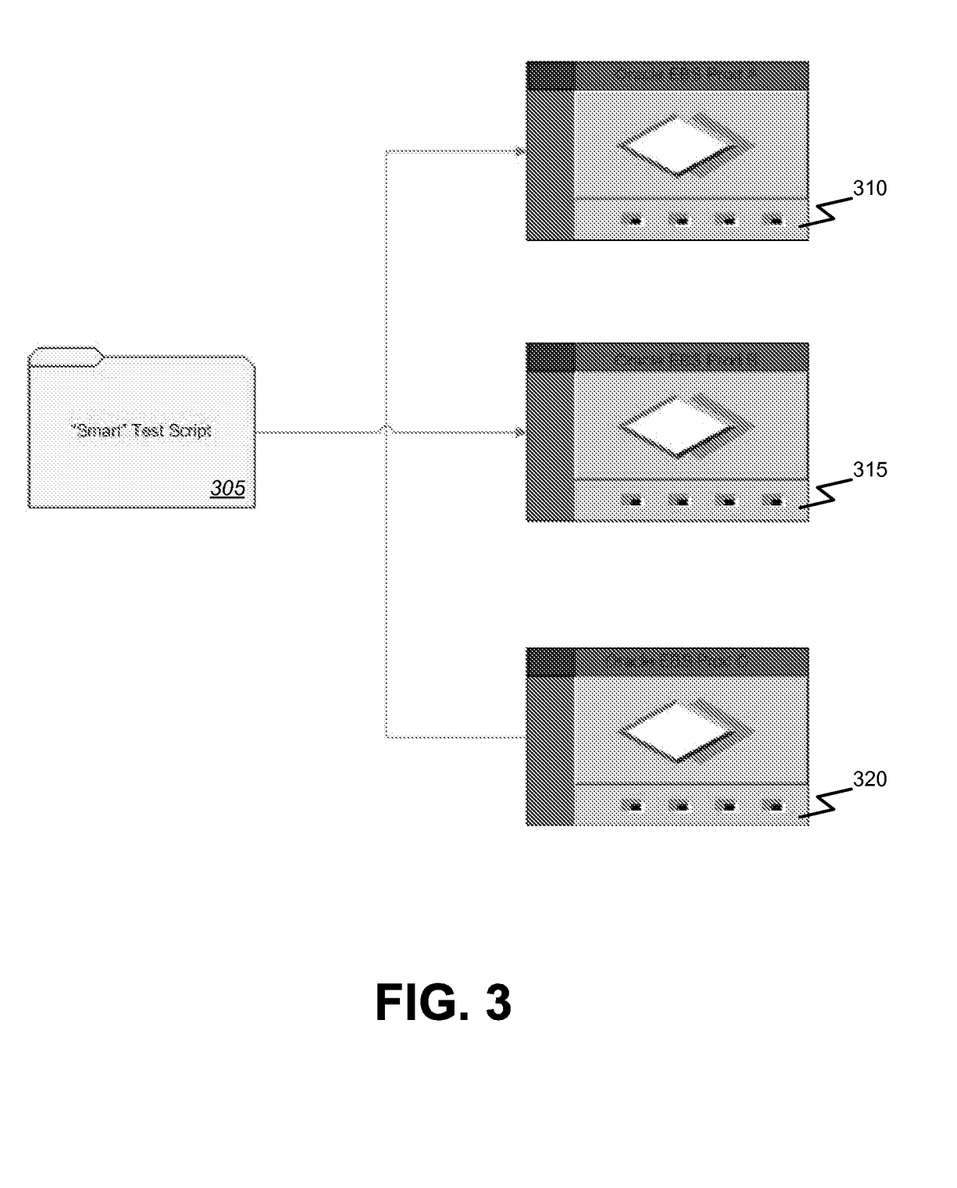
FIG. 3 is a block diagram conceptually illustrating utilizing an intelligent automated script to test software applications according to one embodiment of the present invention.

FIG. 3 is a block diagram conceptually illustrating utilizing an intelligent automated script to test software applications according to one embodiment of the present invention. Generally speaking, a script 305 according to embodiments of the present invention can be used with multiple applications 310-320 and/or versions of applications to perform basic testing without modifying or re-writing the script 305. For example, a script 305 according to one embodiment of the present invention can be used to perform sanity test on an application 310 to determine whether the application's user interface is navigable, i.e., that it performs the basic functions that are expected and allows the user to navigate through the interface to access various features of the application. Furthermore, the same script 305 can be used with other applications 315 and 320 or different versions of an application 310 without re-writing or modifying the script 305. Such a script 305 may be used to test a new application or version of an application, e.g., a new version adapted to or ported to a new environment etc., prior to its release for further testing, development, etc.

Figure 4:
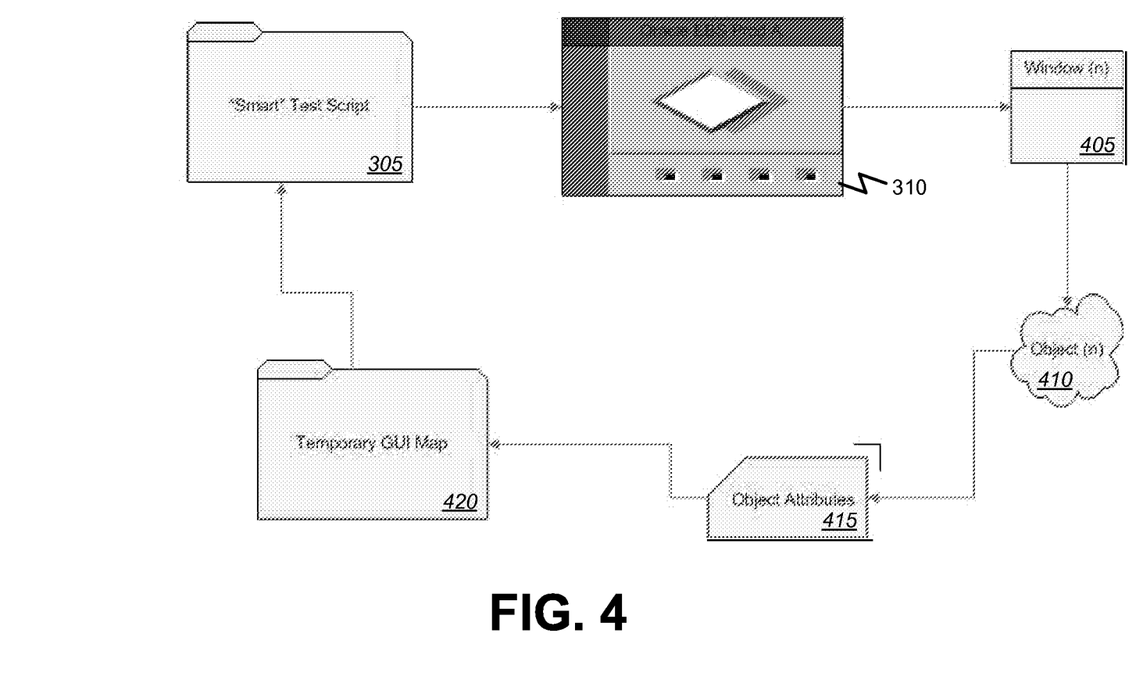
FIG. 4 is a block diagram illustrating a basic process flow for testing a software application according to one embodiment of the present invention.

FIG. 4 is a block diagram illustrating a basic process flow for testing a software application according to one embodiment of the present invention. As illustrated in this example, testing a software application 310 can comprise executing a test script 305 for testing a plurality of versions of the software application 310. Executing the test script can comprise instantiating, launching, or otherwise initiating the execution of the instructions comprising the script 305. The software application 310 can be initiated from the test script 305. Initiating the application 310 can also comprise instantiating, calling, launching, or otherwise initiating the execution of the instructions comprising the application 310.

Upon initiation of the application 310, as is common, a main window 405 of the application 310 can be opened. This window 405 can have a number of objects 410 such as various user interface elements. For example, the objects 410 can include, but are not limited to, any number of textboxes, buttons, links, checkboxes, menus, radio buttons, etc. Each of these objects 410 can include a number of attributes 415 as is known in the art. By reading the properties of the window 405, the test script 305 can determine the objects 410 therein. Similarly, by reading the properties of the objects 410, the test script can determine the attributes 415 thereof. Stated another way, the test script 305 can identify one or more objects 410 of a first window 405 of the user interface and identify one or more attributes 415 of the one or more objects of the first window.

Once the test script 305 has determined a set of objects 410 and attributes 415 for the main window 405, the test script 305 can save these objects 410 and attributes 415 or an indication thereof in a temporary map 420. The temporary map 420 thus can represent the organization of various user interface elements on the window 405. As can be understood, the application's 310 user interface may represent or comprise a number of different windows. For example, from the main window 405, a number of sub-windows, i.e., child windows, may be opened. Thus, the test script can identify and map these windows in the temporary map 420 as well. Stated another way, building the map 420 of the hierarchical structure of the user interface can further comprise identifying one or more objects of a second window of the user interface, wherein the second window comprises a child window of the first window, identifying one or more attributes of the one or more objects of the second window, and storing an indication of the one or more objects of the second window and an indication of the one or more attributes of the one or more objects of the second window in the map. Such mapping can continue with child and grandchild windows of the user interface.

The resulting map 420 thus provides a hierarchical representation of the applications 310 user interface which can then be used by the test script to navigate and test the application 310. That is, the software application 310 can be tested with the test script 305 based on the temporary map 310. As noted, testing the software application 310 based on the temporary map 420 can comprise performing a sanity test on elements of the user interface. The sanity test of the user interface can comprise manipulating elements of the user interface. Thus, the test script can identify the elements of the user interface and, based on the type of element present, manipulate the element in a predetermined manner, e.g., click a button, or link, select a menu item, etc., to determine a response from the application. The response may include an error message. Error messages resulting from manipulation of the elements of the user interface can be reported and/or saved for evaluation of the test.

Figure 5:
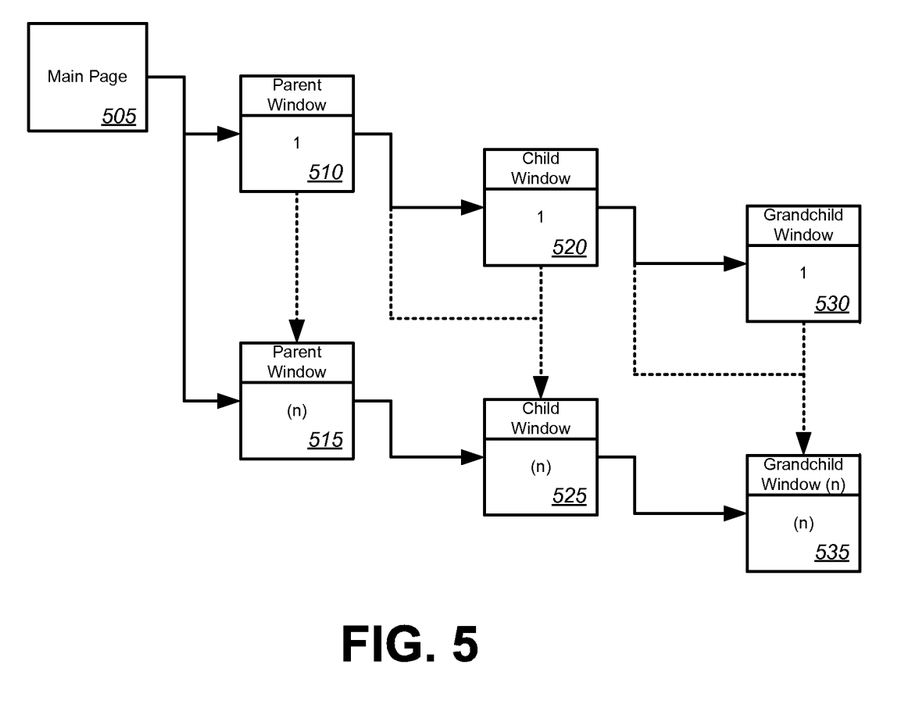
FIG. 5 is a block diagram illustrating an exemplary structure of an application which can be a subject of a test according to embodiments of the present invention.

FIG. 5 is a block diagram illustrating an exemplary structure of an application which can be a subject of a test according to embodiments of the present invention. As noted above, a user interface of an application to be tested may comprise multiple layers of windows. In this example, the main window or page 505 has a number of sub-windows or parent windows 510 and 515. Each of these windows 510 and 515 can in turn have a number of child windows 520 and 525 which may also in turn have a number sub-windows or grandchild windows 530 and 535. As will be seen the structure of the temporary map can follow this hierarchical structure to provide a map or topology of the relationship between the windows of the user interface of the application and the objects in each of those windows.

Figure 6:
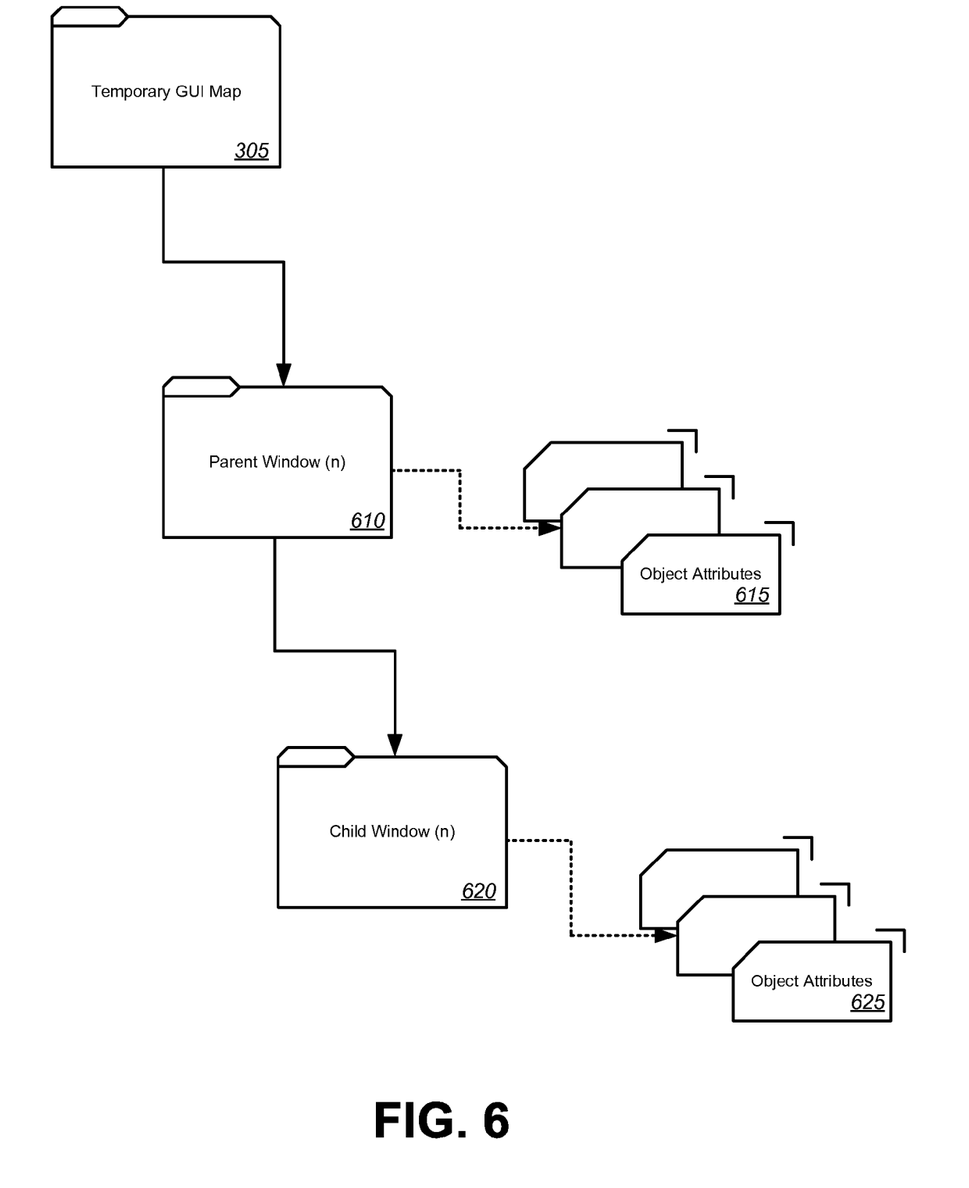
FIG. 6 is a block diagram illustrating elements of a temporary object map according to one embodiment of the present invention.

FIG. 6 is a block diagram illustrating elements of a temporary object map according to one embodiment of the present invention. In this example, the temporary map 305 includes a representation of a number of parent windows 610 having a number of child windows 620. Furthermore, each parent window 610 and each child window 620 can have a number of object having attributes 615 and 625 as described above. Generally speaking, the representations of the parent windows 610 and child windows 620 and the attributes 615 and 625 of each can be stored in any of a variety of manners and/or formats but generally reflect the hierarchical structure of the user interface of the application. For example, the windows can be represented as a series of folders and sub-folders into which documents representing the object attributes 615 and 625 are stored. For example, the object attributes or indications thereof may be stored in the form of one or more eXtensible Markup Language (XML) documents. However, other formats and structures are also contemplated and considered to be within the scope of the present invention.

Regardless of the exact formats used, the temporary map 305 can represent the structure of the user interface of the application and can then be used by the test script for testing the application as described above. Once the testing of a particular object and/or window is complete, that information can be removed from the temporary map 305 to indicate its completion.

Figure 7:
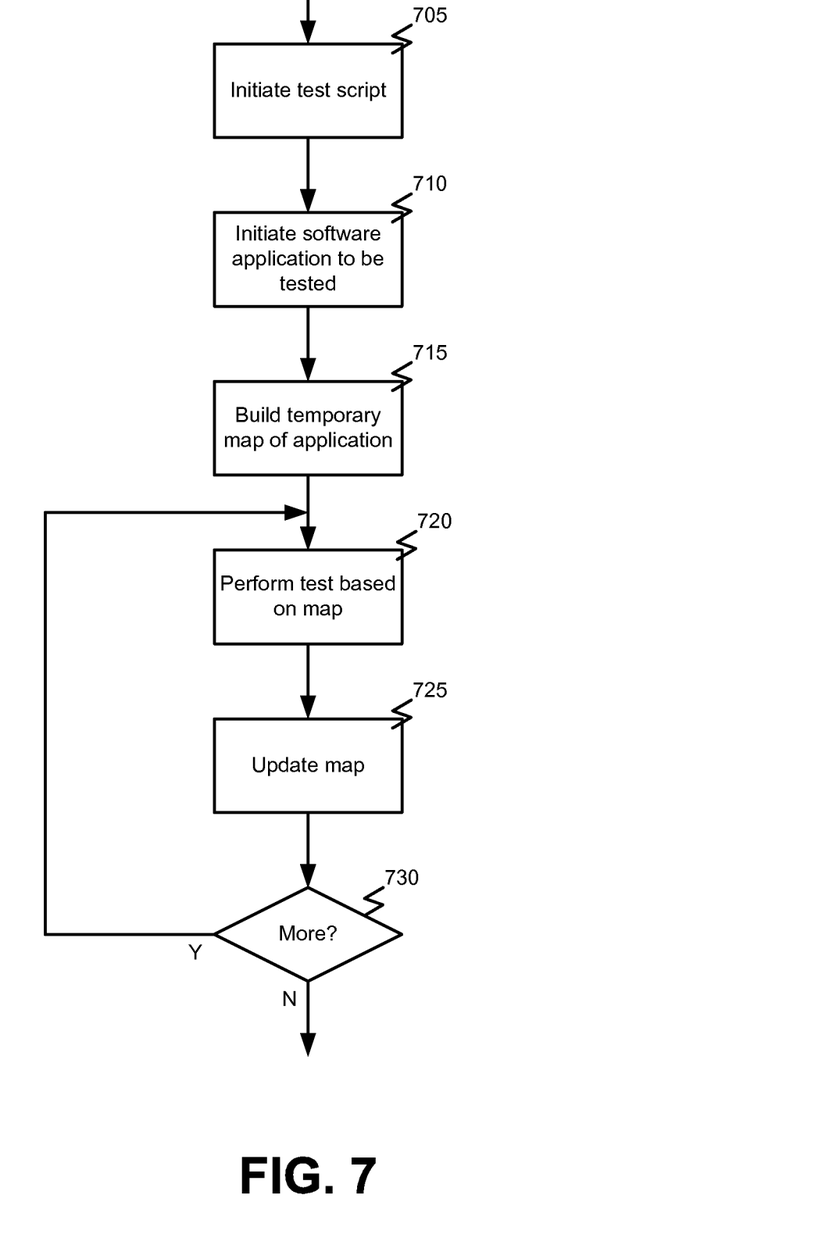
FIG. 7 is a flowchart illustrating at a high level a process for utilizing an intelligent automated script to test software applications according to one embodiment of the present invention.

FIG. 7 is a flowchart illustrating at a high level a process for utilizing an intelligent automated script to test software applications according to one embodiment of the present invention. In this example, the process begins with executing 705 or initiating a test script for testing a plurality of versions of the software application. For example, executing 705 the test script can comprise instantiating a first instance or copy of the test script for testing the first version of the software application. A first version of the software application can be initiated 710 from the test script. A temporary map of the first version of the software application can be built 715 with the test script. The first version of the software application can be tested 720 with the test script based on the temporary map. The temporary map can be updated 730 upon completion of a test of any of the elements represented therein. That is, upon completion of testing of an object represented in the temporary map, that representation can be deleted from the temporary map.

Figure 8:
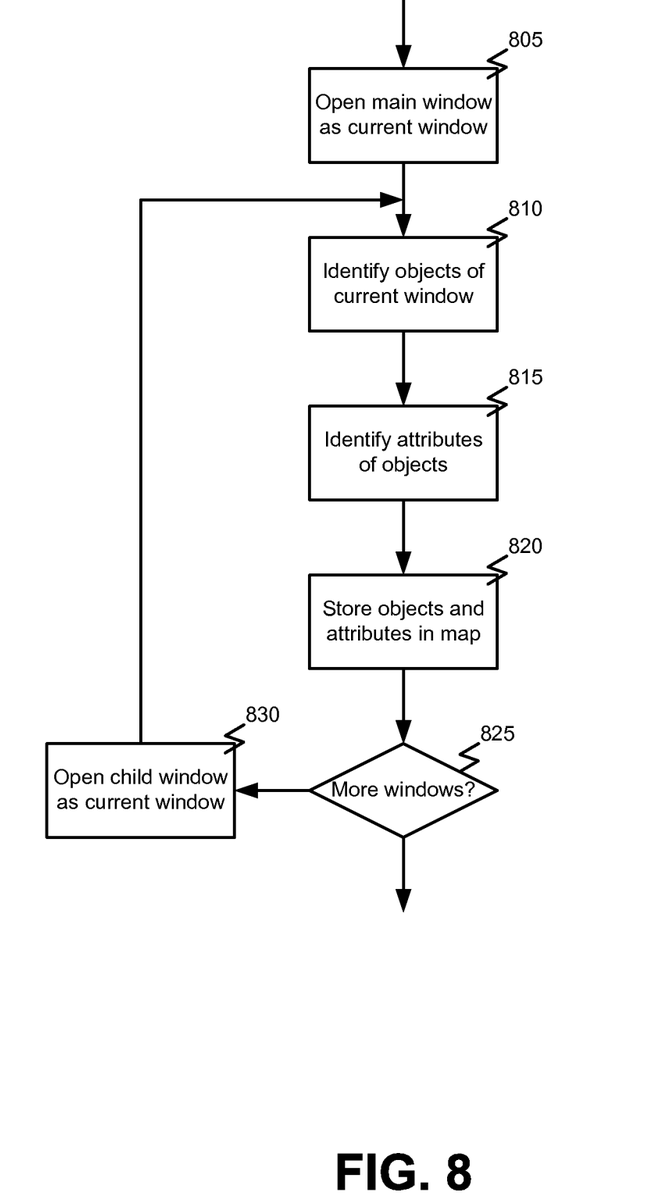
FIG. 8 is a flowchart illustrating additional details of a process for utilizing an intelligent automated script to test software applications according to one embodiment of the present invention.

FIG. 8 is a flowchart illustrating additional details of a process for utilizing an intelligent automated script to test software applications according to one embodiment of the present invention. In this example, as when initiating a test, processing can begin with opening 805 a first or main window of the application. Building the map of the hierarchical structure of the user interface can then comprise identifying 810 one or more objects of a first window of the user interface, identifying 815 one or more attributes of the one or more objects of the first window, and storing 820 an indication of the one or more objects of the first window and an indication of the one or more attributes of the one or more objects of the first window in the map. A determination 825 can then be made as to whether additional windows remain in the user interface. This determination can be based, for example, on the properties or attributes of the current window and/or the objects therein.

If 825, additional windows remain to be mapped in the user interface, one or more child windows can be opened as the current window 830 and mapping can be repeated for those windows. That is, building the map of the hierarchical structure of the user interface can further comprise identifying 810 one or more objects of a second window of the user interface, wherein the second window comprises a child window of the first window, identifying 815 one or more attributes of the one or more objects of the second window, and storing 820 an indication of the one or more objects of the second window and an indication of the one or more attributes of the one or more objects of the second window in the map. Such mapping can continue with child and grandchild windows of the user interface until the user interface is mapped.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of testing a software application, the method comprising:
    executing, by a computer system, a pre-defined test script, the pre-defined test script defining one or more tests executable on a plurality of different software applications without modification to the one or more tests of the pre-defined test script, each of the plurality of different software applications providing a user interface, the user interface of each application having a different hierarchical structure of a plurality of windows and objects within the user interface;
    initiating, by the computer system, a first software application of the plurality of different software applications from the pre-defined test script;
    building, by the computer system with the pre-defined test script, a temporary map of the first software application, the temporary map of the first software application comprising a map of the hierarchical structure of the user interface of the first software application based on execution of the first software application by the pre-defined test script;
    testing, by the computer system, the first software application with the one or more test of the pre-defined test script based on the temporary map of the first software application;
    initiating, by the computer system, a second software application of the plurality of different software applications from the pre-defined test script;
    building, by the computer system with the pre-defined test script, a temporary map of the second software application, the temporary map of the second software application comprising a map of the hierarchical structure of the user interface of the second software application based on execution of the second software application by the pre-defined test script; and
    testing, by the computer system, the second software application with the one or more tests of the pre-defined test script based on the temporary map of the second software application without modification to the pre-defined test script.

2. The method of claim 1, wherein the plurality of different software applications comprises an enterprise suite of applications.

3. The method of claim 1, wherein testing the first software application based on the temporary map of the first software application comprises performing a sanity test on elements of the user interface.

4. The method of claim 3, wherein the sanity test of the user interface comprises manipulating elements of the user interface.

5. The method of claim 4, further comprising reporting, by the computer system, error messages resulting from manipulation of the elements of the user interface.

6. The method of claim 1, wherein building the map of the hierarchical structure of the user interface comprises:
    identifying one or more objects of a first window of the user interface;
    identifying one or more attributes of the one or more objects of the first window; and
    storing an indication of the one or more objects of the first window and an indication of the one or more attributes of the one or more objects of the first window in the map of the hierarchical structure of the user interface.

7. The method of claim 6, wherein building the map of the hierarchical structure of the user interface further comprises:
    identifying one or more objects of a second window of the user interface, wherein the second window comprises a child window of the first window;
    identifying one or more attributes of the one or more objects of the second window; and
    storing an indication of the one or more objects of the second window and an indication of the one or more attributes of the one or more objects of the second window in the map of the hierarchical structure of the user interface.

8. The method of claim 1, wherein executing the pre-defined test script comprises instantiating a first instance of the pre-defined test script for testing the first software application.

9. The method of claim 8, further comprising instantiating, by the computer system, a second instance of the pre-defined test script for testing the second software application of the plurality of different software applications without modification to the pre-defined test script.

10. The method of claim 9, further comprising testing, by the computer system, the first software application and testing the second software application in parallel.

11. A system comprising:
    a processor; and
    a memory communicatively coupled with and readable by the processor, the memory having stored therein a series of instructions which, when executed by the processor, cause the processor to test a software application by:
        executing a pre-defined test script, the pre-defined test script defining one or more tests executable on a plurality of different software applications without modification to the one or more tests of the pre-defined test script, each of the plurality of different software applications providing a user interface, the user interface of each application having a different hierarchical structure of a plurality of windows and objects within the user interface, initiating a first software application of the plurality of different software applications from the pre-defined test script, building with the pre-defined test script a temporary map of the first software application, the temporary map of the first software application comprising a map of the hierarchical structure of the user interface of the first software application based on execution of the first software application by the predefined test script, testing the first software application with the one or more tests of the pre-defined test script based on the temporary map of the first software application, initiating a second software application of the plurality of different software applications from the pre-defined test script, building with the pre-defined test script a temporary map of the second software application, the temporary map of the second software application comprising a map of the hierarchical structure of the user interface of the second software application based on execution of the second software application by the pre-defined test script, and testing the second software application with the one or more tests of the pre-defined test script based on the temporary map of the second software application without modification to the pre-defined test script.

12. The system of claim 11, wherein testing the first software application based on the temporary map of the first software application comprises performing a sanity test on elements of the user interface and wherein the sanity test of the user interface comprises manipulating elements of the user interface.

13. The system of claim 12, further comprising reporting error messages resulting from manipulation of the elements of the user interface.

14. The system of claim 11, wherein building the map of the hierarchical structure of the user interface comprises:
identifying one or more objects of a first window of the user interface;
identifying one or more attributes of the one or more objects of the first window; and
storing an indication of the one or more objects of the first window and an indication of the one or more attributes of the one or more objects of the first window in the map of the hierarchical structure of the user interface.

15. The system of claim 14, wherein building the map of the hierarchical structure of the user interface further comprises:
identifying one or more objects of a second window of the user interface, wherein the second window comprises a child window of the first window;
identifying one or more attributes of the one or more objects of the second window; and
storing an indication of the one or more objects of the second window and an indication of the one or more attributes of the one or more objects of the second window in the map of the hierarchical structure of the user interface.

16. The system of claim 11, wherein executing the pre-defined test script comprises instantiating a first instance of the pre-defined test script for testing the first version of the software application.

17. The system of claim 16, further comprising instantiating a second instance of the pre-defined test script for testing the second software application of the plurality of different software applications without modification to the pre-defined test script and testing the first software application and testing the second software application in parallel.

18. A memory having stored thereon a series of instruction which, when executed by a processor, cause the processor to test a software application by:
executing a pre-defined test script, the pre-defined test script defining one or more tests executable on a plurality of different software without modification to the one or more tests of the pre-defined test script, each of the plurality of different software applications providing a user interface, the user interface of each application having a different hierarchical structure of a plurality of windows and objects within the user interface;
initiating a first software application of the plurality of different software applications from the pre-defined test script;
building with the pre-defined test script a temporary map of the first software application, the temporary map of the first software application comprising a map of the hierarchical structure of the user interface of the first software application based on execution of the first software application by the pre-defined test script;
testing the first software application with the one or more tests of the pre-defined test script based on the temporary map of the first software application;
initiating a second software application of the plurality of different software applications from the pre-defined test script;
building with the pre-defined test script a temporary map of the second software application, the temporary map of the second software application comprising a map of the hierarchical structure of the user interface of the second software application based on execution of the second software application by the pre-defined test script; and
testing the second software application with the one or more tests of the pre-defined test script based on the temporary map of the second software application without modification to the pre-defined test script.

19. The memory of claim 18, wherein testing the first software application based on the temporary map of the first software application comprises performing a sanity test on elements of the user interface and wherein the sanity test of the user interface comprises manipulating elements of the user interface.

20. The memory of claim 18, wherein building the map of the hierarchical structure of the user interface comprises:
identifying one or more objects of a first window of the user interface;
identifying one or more attributes of the one or more objects of the first window; and
storing an indication of the one or more objects of the first window and an indication of the one or more attributes of the one or more objects of the first window in the map of the hierarchical structure of the user interface.

21. The memory of claim 20, wherein building the map of the hierarchical structure of the user interface further comprises:
identifying one or more objects of a second window of the user interface, wherein the second window comprises a child window of the first window;
identifying one or more attributes of the one or more objects of the second window; and
storing an indication of the one or more objects of the second window and an indication of the one or more attributes of the one or more objects of the second window in the map of the hierarchical structure of the user interface.

22. The memory of claim 18, wherein executing the pre-defined test script comprises instantiating a first instance of the pre-defined test script for testing the first software application.

23. The memory of claim 22, further comprising instantiating a second instance of the pre-defined test script for testing the second version of the software application of the plurality of different software applications without modification to the pre-defined test script and testing the first software application and testing the second software application in parallel.

\* \* \* \* \*